Aug. 20, 1968
R. CATLOW ET AL  3,397,865
BLADED ROTOR FOR A FLUID FLOW MACHINE SUCH
AS A GAS TURBINE ENGINE
Filed Aug. 25, 1967  2 Sheets-Sheet 1
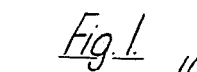
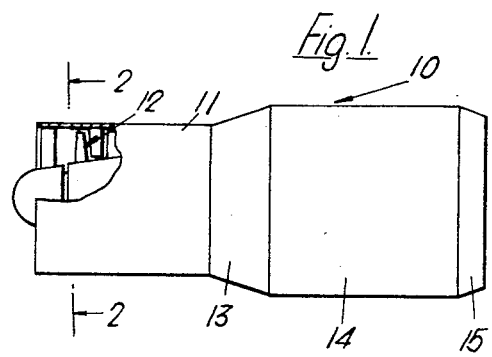
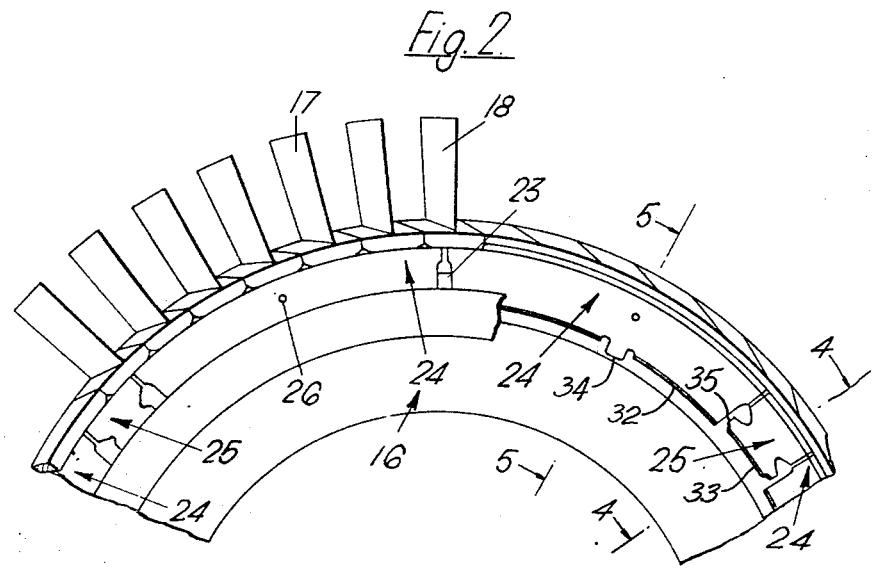
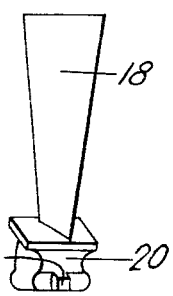
INVENTOR
RONALD CATLOW
PETER ALFRED SHAW
RAYMOND HART
By Cushman, Darby & Cushman
Attorneys

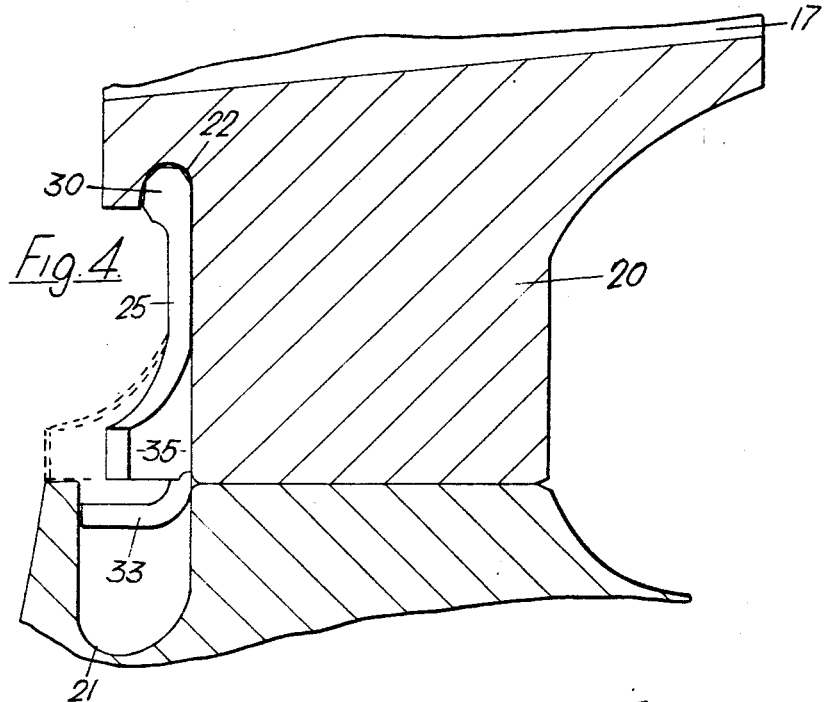
Fig. 4.
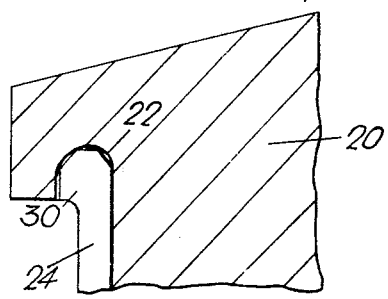
Fig. 5.
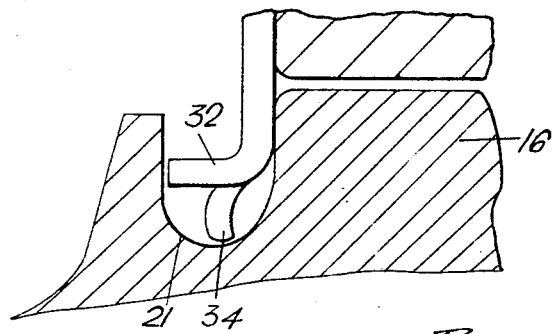
INVENTOR
RONALD CATLOW
PETER ALFRED SHAW
RAYMOND HART
By Cushman, Darby & Cushman
Attorneys 3,397,865
BLADED ROTOR FOR A FLUID FLOW MACHINE
SUCH AS A GAS TURBINE ENGINE
Ronald Catlow, Nelson, and Peter Alfred Shaw and Raymond Hart, Derby, England, assignors to Rolls-Royce Limited, Derby, England, a British company
Filed Aug. 25, 1967, Ser. No. 663,415
Claims priority, application Great Britain, Sept. 13, 1966, 40,932/66
4 Claims. (Cl. 253—77)

ABSTRACT OF THE DISCLOSURE

The invention concerns a bladed rotor (e.g., for a gas turbine engine compressor) whose blades are locked in position by means of a number of retaining plates and at least one lock-plate, all of which extend substantially throughout the axial and radial extent of aligned grooves in the rotor disc and root portions of the blades. Each lock-plate extends throughout a part only of the radial extent of the groove in the disc to permit it to be positioned after the retaining plates have been assembled, and each lock-plate is provided with at least one tab which may be bent to engage the disc to retain the said lock-plate in position.

---

This invention concerns a bladed rotor for a fluid flow machine. Although it is not so restricted, the invention is more regularly concerned with a bladed rotor forming part of a compressor of a gas turbine engine.

According to the present invention, there is provided a bladed rotor for a fluid flow machine comprising a rotor disc having a radially extending peripheral groove and a plurality of axially extending peripheral slots therein, a plurality of angularly spaced apart blades each of which has a root portion mounted and radially retained in one of the extending peripheral slots, at least the majority of the said blades having aligned grooves in their root portions which are aligned with the peripheral groove of the rotor disc, and a plurality of retaining plates and at least one integrally formed lock-plate which extend from the peripheral groove to the root portion grooves to axially position the blades in the slots. All of the retaining plates and the at least one lock-plate extend substantially throughout the axial and radial extent of the root portion grooves and extend substantially throughout the axial extent of the peripheral groove. The retaining plates extend throughout substantially the whole radial extent of the peripheral groove while each lock-plate engages the disc so that it extends throughout a part only of the radial extent of the peripheral groove therein to permit it to be positioned after the retaining plates have been assembled.

The or each said lock-plate may be provided with at least one tab which may be bent to engage the disc to retain the said lock-plate in position.

A minority of the blades may have abutment portions which are engageable with the retaining plates to limit circumferential movement thereof in the peripheral and root portion grooves.

Each of the said retaining plates may be provided with a hole which is engageable by a tool to effect circumferential movement of the respective retaining plate.

The invention also comprises a gas turbine engine provided with a bladed rotor as set forth above.

The invention is illustrated, merely by way of example, in the accompanying drawings, in which:

FIGURE 1 is a partly broken-away diagrammatic view of a gas turbine engine provided with a bladed rotor in accordance with the present invention, FIGURE 2 is a broken-away diagrammatic sectional view taken on the line 2—2 of FIGURE 1, FIGURE 3 is a perspective view of one of the blades shown in FIGURE 2, and FIGURES 4 and 5 are broken-away sectional views taken respectively on the lines 4—4 and 5—5 of FIGURE 2.

In FIGURE 1 there is shown a gas turbine engine 10 having an engine casing 11 within which there are mounted in flow series a compressor 12, combustion equipment 13 and a turbine 14, the turbine exhaust gases being directed to atmosphere through an exhaust duct 15.

The compressor 12 has a number of rotor discs 16 of which, to simplify the description, only one will be referred to below.

The rotor disc 16 is provided with a plurality of angularly spaced apart blades of which the majority are constituted by blades 17 and the minority are constituted by blades 18, the differences between the blades 17, 18 being discussed below. Each of the blades 17, 18 has a root portion 20 (FIGURES 4 and 5), a part of which is of dove-tail shape and is mounted and radially retained in an axially extending peripheral slot (not shown) in the rotor disc 16. Each of the said slots extends between opposite sides of the rotor disc 16.

The rotor disc 16, adjacent its upstream side, is provided with a radially extending peripheral groove 21. Each of the blades 17 has a groove 22 in its root portion 20, the grooves 22 of the various blades 17 being circumferentially aligned with themselves and being radially aligned with the peripheral groove 21.

If desired, the peripheral groove 21 could be provided on the downstream, as opposed to the upstream, side of the rotor disc 16.

The blades 18 are provided with axially extending projections 23 whose purpose is described below.

The blades 17, 18 are axially positioned in their slots in the rotor disc 16 by means of a series of retaining plates 24 and lock-plates 25 which are mounted in the grooves 21, 22 and which are respectively of relatively great and relatively small angular extent. Every third such plate is constituted by a lock-plate 25, the remaining plates being constituted by the retaining plates 24. Each of the retaining plates 24 has a centrally located hole 26 which is engageable by a tool (not shown) to effect circumferential movement of the respective retaining plate 24.

The plates 24, 25 are respectively provided with heads 30 which substantially fill the grooves 22 and thus extend substantially throughout both the axial and radial extent of the grooves 22. The plates 24, 25, moreover, are respectively provided with tongues 32, 33, which are disposed within and extend substantially throughout the axial extent of the peripheral groove 21. The tongues 32, 33 axially locate the plates 24, 25 respectively within the peripheral groove 21 of the rotor disc 16.

Each of the retaining plates 24 is also provided with a tongue 34 which extends to adjacent the base of the groove 21 with the result that each of the retaining plates 24 extends throughout substantially the whole radial extent of the groove 21.

The lock-plates 25, however, extend throughout a part only of the radial extent of the groove 21, so that they can be positioned after the retaining plates 24 have been assembled. The lock-plates 25 are provided with side tabs 35 which may be bent from the full line position shown in FIGURE 4 to the dotted line position shown therein in which they engage the rotor disc 16 to retain the lock plates 25 in position.

The rotor is assembled by first inserting the blades 17 in their slots in the rotor disc 16. The grooves 22 are then aligned with each other and with the groove 21 so as to leave at least one space in the aligned grooves 22 for the introduction therethrough of the various retaining plates 24 into the grooves 21, 22 so as to retain the blades 17 axially. The blades 18 are now introduced, each blade 18 being disposed between each adjacent pair of retaining plates 24. The retaining plates 24 are then moved circumferentially until they abut the projections 23 of the blades 18, the retaining plates 24 thus entering the grooves 22 in the blades 18 so as to retain the latter axially. This leaves gaps between the retaining plates 24.

In order to fill the gaps between the retaining plates 24, the lock-plates 25, with their side tabs 35 in the full line position, are introduced into the groove 21. By reason of their smaller radial extent than the retaining plates 24, the lock plates 25 may be introduced into the groove 21 by first introducing the free end of the tongue 33 into the peripheral groove 21 sufficiently far to allow the head 30 of the lock-plate to pass axially inwardly of the leading edge of the blade root 20. The lock-plate 25 is then able to be rotated about the free end of its tongue 33 until it is upright in the peripheral groove 21. The plate 35 is then moved radially outwardly into the grooves 22 and so to the position shown in FIGURE 4. The tabs 35 are then bent to the dotted line position so as to engage the rotor disc 16. When this is done, the whole rotor disc will be assembled.

We claim:

1. A bladed rotor for a fluid flow machine comprising a rotor disc having a radially extending peripheral groove and a plurality of axially extending peripheral slots therein, a plurality of angularly spaced apart blades each of which has a root portion mounted and radially retained in one of said axially extending peripheral slots, at least the majority of the said blades having aligned grooves in their root portions which are aligned with the said peripheral groove, and a plurality of retaining plates and at least one integrally formed lock-plate which extends from the peripheral groove to the root portion grooves to axially position the blades in the slots, all the said retaining plates and the at least one lock-plate extending substantially throughout the axial and radial extent of the said root portion grooves and extending substantially throughout the axial extent of the said peripheral groove, the said retaining plates extending throughout substantially the whole radial extent of the peripheral groove, each lock-plate engaging the disc so that it extends throughout a part only of the radial extent of the peripheral groove therein to permit it to be positioned after the retaining plates have been assembled.

2. A rotor as claimed in claim 1 in which the said lock-plate is provided with at least one tab which may be bent to engage the disc to retain the said lock-plate in position.

3. A rotor as claimed in claim 2 in which a minority of the blades have abutment portions which are engageable with the said retaining plates to limit circumferential movement thereof in the said peripheral and root portion grooves.

4. A rotor as claimed in claim 1 in which each of the said retaining plates is provided with a hole which is engageable by a tool to effect circumferential movement of the retaining plate.

References Cited

UNITED STATES PATENTS 3,043,562  7/1962  Van Nest et al. _____ 253—77

FOREIGN PATENTS 928,349  6/1963  Great Britain.
954,323  4/1964  Great Britain.

EVERETTE A. POWELL, JR., *Primary Examiner.*